(12) United States Patent
Gehrmann

(10) Patent No.: US 8,255,678 B2
(45) Date of Patent: *Aug. 28, 2012

(54) METHOD OF BOOTING A PROCESSING DEVICE

(75) Inventor: Christian Gehrmann, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,759

(22) Filed: Jan. 11, 2012

(65) Prior Publication Data

US 2012/0117369 A1 May 10, 2012

Related U.S. Application Data

(63) Continuation of application No. 12/281,960, filed as application No. PCT/EP2007/001394 on Feb. 19, 2007, now Pat. No. 8,135,945.

(60) Provisional application No. 60/743,444, filed on Mar. 9, 2006.

(30) Foreign Application Priority Data

Dec. 21, 2006 (EP) .................................... 06388069

(51) Int. Cl.
*G06F 15/177* (2006.01)

(52) U.S. Cl. ................................................ 713/2; 713/1

(58) Field of Classification Search .................. 713/2, 1
See application file for complete search history.

(56) References Cited

U.S. PATENT DOCUMENTS

| 5,781,774 | A | * | 7/1998 | Krick ................................. 713/1 |
| 6,012,142 | A | * | 1/2000 | Dokic et al. ....................... 713/2 |
| 6,473,857 | B1 | * | 10/2002 | Panas et al. ....................... 713/2 |
| 7,257,714 | B1 | * | 8/2007 | Shen ............................. 713/186 |
| 7,707,592 | B2 | * | 4/2010 | Wesslen et al. ............... 719/328 |
| 8,135,945 | B2 | * | 3/2012 | Gehrmann ....................... 713/2 |
| 2001/0020269 | A1 | * | 9/2001 | Kawade et al. ................. 713/100 |
| 2004/0153638 | A1 | * | 8/2004 | Tseng et al. ...................... 713/1 |
| 2006/0107078 | A1 | * | 5/2006 | Blinick et al. ................ 713/300 |
| 2006/0149959 | A1 | * | 7/2006 | Rothman et al. .................. 713/2 |
| 2009/0307478 | A1 | | 12/2009 | Gehrmann |

* cited by examiner

*Primary Examiner* — Chun Cao
(74) *Attorney, Agent, or Firm* — Roger S. Burleigh

(57) ABSTRACT

A method for booting a processing device, the processing device comprising a first and a second processing unit, the method comprising: detecting by the first processing unit, whether at least one boot configuration parameter is accessible from a non-volatile storage medium of the processing device, the at least one configuration parameter being indicative of a boot interface; if said at least one configuration parameter is available, forwarding at least a part of the detected at least one configuration parameter by the first processing unit to the second processing unit; otherwise detecting by at least one of the first and second processing units whether a boot interface is available to the processing device; booting at least the second processing unit from the indicated or detected boot interface.

8 Claims, 8 Drawing Sheets

METHOD OF BOOTING A PROCESSING DEVICE

CROSS REFERENCE TO RELATED APPLICATIONS

This application is a continuation of U.S. application Ser. No. 12/281,960, filed Jan, 13, 2009, now pending, which was the national stage filing of International Application No. PCT/EP07/01394, filed Feb. 19, 2007, which claimed the benefit of U.S. Provisional Application No. 60/743,444, filed Mar. 9, 2006, the disclosures of which are incorporated herein by reference.

TECHNICAL FIELD

The invention relates to the booting of processing devices comprising a first and a second processing unit.

BACKGROUND

One example of a processing device comprising a first and a second processing unit includes a mobile platform, i.e. a chipset/integrated circuit for use in a plurality of different mobile communications devices. A mobile platform can be used in several different hardware configurations including e.g. a mobile phone architecture using two central processing units (CPUs). In such a two-CPU mobile phone architecture typically one of the CPUs is used as an access CPU that handles the communication/real-time constrained tasks, and the other CPU is used as an application CPU that handles the phone application tasks. It is a cost advantage to include both the application and the access CPU on the same baseband digital application specific integrated circuit (ASIC). However, in order to allow the platform to be used together with more powerful application systems, it is generally desirable to be able to use the platform together with an external CPU and application system instead of the application CPU of the platform. For example, an electronic device including the platform may be connected to another data processing system such as a computer via a suitable interface, e.g. via a universal serial bus (USB). Such a configuration in which an external CPU is used instead of the internal application CPU of the platform is also called a bridge configuration. In this case, there is no direct use of the internal application CPU.

According to a first aspect, It is thus desirable to provide an initialization or boot process for the processing device that facilitates both situations in an efficient and cost-effective way.

European patent application EP 1 486 869 discloses a boot process for initializing a co-processor of a system including a main processor and a co-processor. Even though this process avoids the need for a NOR flash memory to be associated with the coprocessor it still requires two or more flash memories connected to the respective processors.

According to another aspect, the booting of a processing device such as a mobile platform for normal operation typically requires that certain basic or platform software, e.g. an operating system and/or firmware, and possibly certain configuration parameters have been installed on the processing device, e.g. during manufacturing of the device or a subsequent configuration. This installation is typically performed by loading the software onto the processing device, e.g. into a non-volatile memory such as a flash memory of the device. To this end the processing device can typically be operated in a special mode of operation, referred to as software flashing mode or service mode, in which the processing device is adapted to load software over an external interface so that the device can be configured for normal use. The process of loading the basic software and configuration parameters will also be referred to as external load.

In some mobile platforms external load is indicated by a service pin that is connected to the access CPU. The service pin can for example be trigged when the user enters a specific keyboard combination. Once the service mode is detected, the platform loads the software to be executed from an external interface, instead from the internal non-volatile memory, e.g. flash memory. However, according to the second aspect, it remains a problem to provide a boot process that facilitates operation in a service mode irrespective of the hardware configuration.

SUMMARY

According to the first aspect, disclosed is a method for booting a processing device, the processing device comprising a first and a second processing unit, the method comprising:

detecting by the first processing unit, whether at least one boot configuration parameter is accessible from a non-volatile storage medium of the processing device, the at least one configuration parameter being indicative of a boot interface;

if said at least one configuration parameter is available, forwarding at least a part of the detected at least one configuration parameter by the first processing unit to the second processing unit; otherwise detecting by at least one of the first and second processing units whether a boot interface is available to the processing device;

booting at least the second processing unit from the indicated or detected boot interface.

Consequently, the above boot process may be performed independently of whether the processing device boots in a normal configuration, i.e. using both its processing units or in a bridge configuration in which only one of the processing units is used, thereby providing a general-purpose start-up or boot procedure for the multi-processor device.

In particular, embodiments of the boot process described herein do not require the presence of a flash memory, and may thus be used in processing devices operated in different hardware configurations.

Furthermore, embodiments of the boot process described herein do not require a pure hardware-implicit bridge configuration, i.e. an entirely hardware-based detection of a bridge configuration based on which interfaces are connected, since bridge interfaces such as USB may also be used also for other non-bridge purposes.

For a manufacturer of a mobile platform it is an interesting advantage to be able to produce a general purpose platform including a single boot program that can boot irrespective of the specific hardware and software configuration it may be chosen to be operated in. For example, it is an advantage of the boot process described herein that it allows provision of a low cost mobile platform for use in smart phones or in modem products such as USB plugs etc., where the platform is bootable even without any large non-volatile memory like a flash memory.

The detected or indicated boot interface may be an internal interface, i.e. an interface to another module/unit included in the processing device, or an external interface, i.e. an interface for connecting to an external device. Examples of an internal interface include an interface to a non-volatile memory included in the processing device. Accordingly, the external CPU is external to the chip/chipset/integrated circuit board of the mobile platform. The external CPU may be a CPU in the same processing device, e.g. a CPU on a separate integrated circuit board, or it may be a CPU of a separate device different from the processing device that includes the mobile platform.

In one embodiment detecting whether one or more boot configuration parameters are accessible from a non-volatile storage medium of the processing device includes detecting whether the processing device includes a non-volatile memory for storing configuration parameters, and if the processing device includes a non-volatile memory for storing configuration parameters, detecting whether the detected non-volatile memory has stored thereon a data file including the one or more configuration parameters. Examples of configuration parameters may include security parameters such as software version information, a customer ID, platform hardware configuration parameters, such as a bridge/non-bridge flag, a bridge interface identification, and/or the like.

Since the boot polling order of the boot procedure initially attempts to find bridge configuration information in the non-volatile platform storage when such memory is available and the platform is suitably customized, the boot procedure described herein works particularly efficiently in configurations with non-volatile storage on the mobile platform system. This is advantageous, since such configurations are typically used for mass market products with stringent start-up performance requirements. Nevertheless, since in the absence of stored bridge configuration information, the process polls possible external interfaces to detect whether any bridge configuration information is available from any of these interfaces, the boot process can also be performed in other "flash-less" configurations.

In one embodiment booting at least the second processing unit from the indicated or detected boot interface includes receiving boot software from the identified or detected boot interface, i.e. software for performing at least a part of the boot process. When receiving the boot software further comprises performing a security check of the boot software by at least one of the first and second processing units before execution of the received boot software, an increased security is provided against attempts to boot the system with unauthorised software or by an unauthorised user. For example, the security check may include a verification of the authenticity and/or the integrity of the boot software and/or the authenticity and/or authorisation of the provider of the boot software, or the like. The security check may include a cryptographic verification process, e.g. a private and/or public key based cryptographic verification process.

In one embodiment, performing the security check is performed by one of the first and second processing units functioning as a security root for software verification during booting. In one embodiment, the method comprises reading, by the processing unit functioning as a security root security information, wherein the security information is stored protected, e.g. cryptographically protected, in a non-volatile storage medium of the system. Consequently, the most security sensitive functions are confined to one of the processing units, thereby further reducing the risk of malicious attacks.

In one embodiment the method comprises performing, by the first processing unit, a sequence of protocol interactions of a predetermined boot sequence, where only a subset of the protocol interactions is conditioned on said detection whether the one or more configuration parameters are available. Examples of protocol interactions include the exchange of messages, requests, responses, etc., with the second processing unit and/or a storage medium and/or external interfaces. In one embodiment the subset includes less than 5 interactions. Accordingly, when the boot process is constructed such that in the different configurations the respective sequences of interactions only differ from each other in one or a few interactions, a compact boot software may be provided that is applicable irrespective of the hardware configuration. Hence, the boot processes, even though generic, does not require large amounts of memory in the device, and is cost-effective to maintain and install.

According to the second aspect, disclosed is a method for booting a processing device, the processing device comprising a first and a second processing unit, the processing device being selectably bootable in one of a stand-alone configuration and a bridge configuration; wherein, in the stand-alone configuration, the first and the second processing units are initialised to be operational, and wherein, in the bridge configuration, only the second processing unit is initialised to be operational and initialised to be in operational connection with an external processing unit via a communications interface; the method comprising:

detecting whether the processing device is to be booted in the stand-alone or in the bridge configuration;
    if the processing device is to be booted in the bridge configuration, receiving a boot mode indication from the external processing unit via the communications interface, the boot mode indication being indicative of whether the processing device is to be booted in a service mode, in which the processing device is configured to load software from the external processing unit into a non-volatile memory of the processing device;
    responsive to the received boot mode indication booting the processing device in said service mode.

Hence, it is an advantage of embodiments of the boot process described herein that it allows booting a platform device both for normal operation and in a service mode, irrespective of whether the device is operated in a stand-alone configuration or in a bridge configuration.

For example, in a mobile platform USB bridge solution, i.e. a mobile platform that uses USB as communications interface between the mobile platform access CPU and an external CPU system, the boot process described herein allows the external system to indicate whether to boot the platform in a service boot mode or a normal boot mode, without requiring a service pin or other hardware configuration, since an USB connection typically would not provide a connection of the service pin to the external system. Embodiments of the boot process described herein thus provide a generic boot procedure also for "flashless" bridge configurations and configurations without service pin service indication. Nevertheless embodiments of the process may facilitate that the service mode may be indicated by a hardware configuration such as a by setting a pin connected to one of the CPUs or by a protocol interaction with an external system.

It is a further advantage of the boot process described herein that it provides a generic boot process that can work efficiently, e.g. without unnecessary start-up delays, even for non-bridge and/or flash configurations.

In one embodiment, the method further comprises receiving, if the processing device is to be booted in the stand-alone mode, a boot mode indication via a user-interface of the processing device, the boot mode indication being indicative of whether the processing device is to be booted in the service mode. Consequently, the boot process also allows for an indication of a service mode by a user via a user interface of the device. For example, this indication may be provided by a service pin of one of the processing units.

In some embodiments, the processing device is a communications device for providing at least one communications service, wherein the first processing unit is an application central processing unit adapted to execute at least one application software component for providing functionality different from the communications service, and wherein the second processing unit is a communications central processing unit adapted to control the communications service. For example, the processing device may be a platform circuit for one or more mobile communications products, wherein the at least one communications service includes a cellular telecommunications service. Nevertheless, it will be appreciated that the method may also be applied to other types of processing devices.

In one embodiment, each of the first and second processing units includes a corresponding read-only-memory having stored thereon boot code for controlling at least a part of the booting of the corresponding processing unit. Hence, the boot procedure is controlled at least in part by ROM-based code on both processing units. In addition to the boot code stored in the ROM, the boot process is controlled at least in part by boot software stored in writable memory of the device or loaded from an external system via a bridge interface. Hence, at least a part of the boot software may be altered, thereby facilitating maintenance of the device.

When the method comprises communicating boot information between the first and second processing units by means of a predetermined boot protocol, an efficient boot procedure for a multi-CPU architecture, e.g. a 2-CPU architecture is provided.

It is noted that the features of the methods described above and in the following may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

For example, the program code means may be loaded in a memory, such as a RAM (Random Access Memory), from a storage medium, such as a read-only memory (ROM) or other non-volatile memory, such as flash memory, or from another device via a suitable data interface, the described features may be implemented by hardwired circuitry instead of software or in combination with software.

The present invention relates to different aspects including the method described above and in the following, corresponding devices, and computer programs, each yielding one or more of the benefits and advantages described in connection with the above-mentioned methods, and each having one or more embodiments corresponding to the embodiments described in connection with the above-mentioned methods.

In particular, according to one aspect, a processing device comprising a first and a second processing unit is suitably configured to perform the steps of the method described above and in the following.

For the purpose of the present description, the terms processing device and electronic device comprise any portable radio communications equipment and other handheld or portable devices and/or components such as integrated circuit boards thereof. The term portable radio communications equipment includes all equipment such as mobile telephones, pagers, communicators, i.e. electronic organisers, smart phones, personal digital assistants (PDAs), handheld computers, media players, such as mp3 players, digital cameras or other recording devices, embedded devices in the automotive industry, medical devices, or the like.

According to another aspect, a computer program product comprises computer-executable instructions adapted to cause, when executed on a processing device comprising a first and a second processing unit, the processing device to perform the method described above and in the following. In some embodiments, the computer program product is embodied as a computer-readable medium, such as a read-only-memory or a re-writable non-volatile memory, having stored thereon the computer-executable instructions.

For the purpose of the present description, the terms storage means/device and computer-readable medium are intended to comprise any suitable storage medium, device or circuit, e.g. a read-only-memory (ROM), a random access memory (RAM), a flash memory, an Erasable Programmable Read-Only Memory (EPROM), volatile or non-volatile memory, an optical storage device, a magnetic storage device, a diskette, a CD, a hard disk, or the like.

BRIEF DESCRIPTION OF THE DRAWINGS

The above and other aspects will be apparent and elucidated from the embodiments described in the following with reference to the drawing in which.

DETAILED DESCRIPTION

Figure 1:
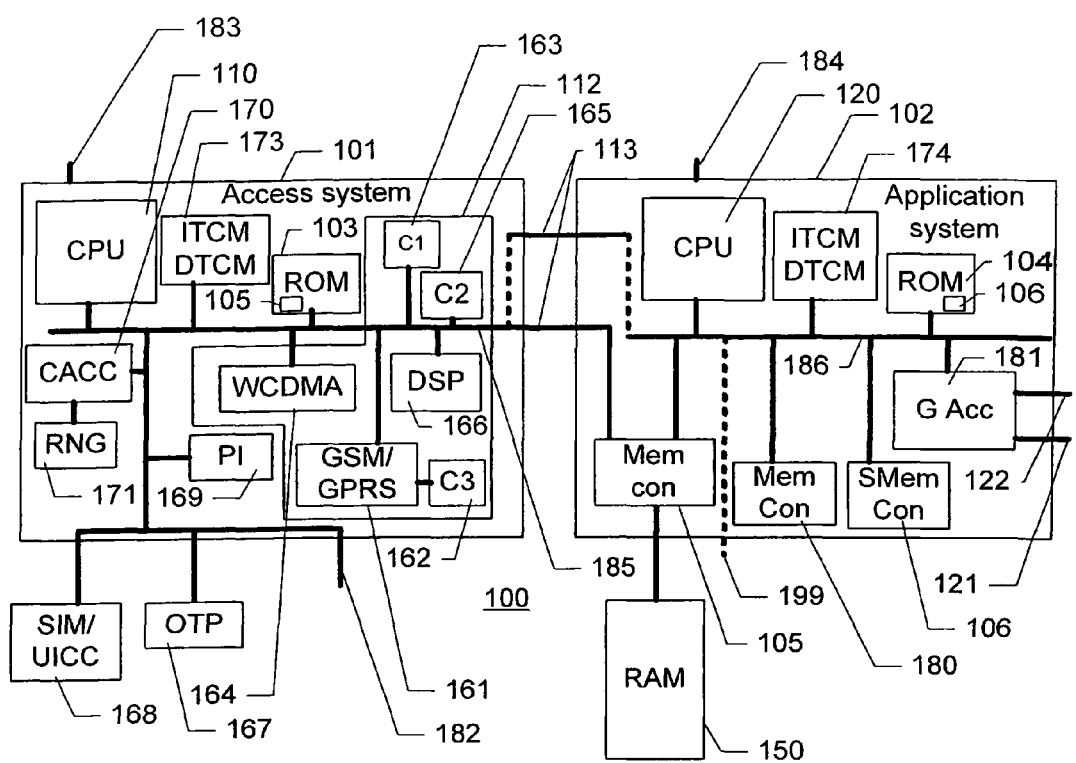
FIG. 1 shows a schematic block diagram of a mobile platform including two CPUs.

FIG. 1 shows a schematic block diagram of a mobile platform system including two CPUs.

The mobile platform system, generally designated 100, includes two subsystems: an access subsystem 101 and an application subsystem 102.

The access subsystem includes an access CPU 110 while the application subsystem 102 includes an application CPU 120. For example, the mobile platform system 100 may be an integrated circuit/chipset for use in a mobile terminal or other communications equipment. The 2-CPU architecture of the mobile platform system 100 thus facilitates a functional split between the access subsystem and the application subsystem. For example, the access subsystem 101 may be configured to handle one or more standardised communications protocols and/or other functionality that require real-time control in which meeting deadlines in a timely fashion is important. The application subsystem 102 on the other hand may be configured to handle end-user functionality and/or other functionality not requiring real-time control.

Various interfaces may be part of the application subsystem and the access subsystem, respectively. For example, the application interface may provide one or more interfaces such as, a display interface 121, a camera interface 122, an audio (e.g. microphone and/or loudspeaker) interface 199, and/or further interfaces (not explicitly shown) such as a keyboard interface, a smart card interface, a memory stick interface, and/or the like. The application subsystem is further shown to include a graphics accelerator 181.

Similarly, the access subsystem 101 may include communications circuitry 112, e.g. GSM a GSM/GPRS module 161, a GSM cipher block 162, a GPRS cipher block 163, a WCDMA module 164, and a WCDMA cipher block 165, a digital signal processor (DSP) 166, and/or the like, and provide one or more further communications interfaces 182, such as an infrared data association (IrDA) interface, an universal serial bus (USB) interface, a Bluetooth interface, a universal asynchronous receiver/transmitter (UART) interface, a serial peripheral interface (SPI), an inter-integrated circuit interface (I2C), and/or the like. The access subsystem further include a One-Time-Programmable memory (OTP) 167, e.g. for storing a chip-unique identifier and/or other parameters. The access subsystem may further provide an interface 168 to a Universal Integrated Circuit Card (UICC), such as a SIM card, a USIM card, or the like.

The access subsystem may further include security modules, such as a platform integrity module 169 for providing platform code and data integrity checks, a crypto accelerator block 170 for providing efficient computation of cryptographic values, such as key generation, message authentication, etc., a random number generator 171 for use in e.g. key generation, and/or the like.

Each of the access subsystem 101 and the application subsystem 102 includes a ROM 103 and 104, respectively, each including corresponding boot code 105 and 106, respectively. The boot code in the respective ROMs is adapted to perform at least an initial part of the boot process, e.g. the boot process until the boot software from the internal memory or the external system is loaded. Furthermore, the boot code stored in ROM 103 of the access subsystem 101 provides the platform security root functionality. In a mobile terminal with an access subsystem and an application subsystem where the application subsystem may be disabled when configured in a bridge configuration, it is an advantage that the access subsystem functions as a security root, since the access subsystem is always available regardless of the chosen configuration.

Each of the access subsystem 101 and the application subsystem 102 further includes Instruction and Data Tightly Coupled Memories (ITCM/DTCM) 173 and 174, respectively. The ITCM is on-chip memory into which an initial part of the boot code is loaded. Furthermore, each of the access subsystem 101 and the application subsystem 102 is shown with a service pin 183 and 184, respectively. In each subsystem, the respective components are interconnected via at least one suitable bus 185 and 186, respectively, e.g. a high speed bus or a high speed bus and a peripheral bus, and/or the like. The access subsystem and the application subsystem communicate with each other via a suitable interface 113, such as a communications interface between the access and application CPU, e.g. a serial link, one or more shared memories, and/or the like.

The mobile platform system 100 may include one or more memory controllers for controlling access to one or more internal memories. In the example of FIG. 1, the mobile platform includes a memory controller 105 for controlling a common random access memory (RAM) 150 shared by the access and application subsystems. Hence, the memory controller 105 functions as memory arbiter which is configured by the access subsystem. For example, the memory controller may be configured such that respective memory regions are access-protected from the application system, i.e. the controller can prevent access from the application system to certain memory regions that belong to the access system. Alternatively or additionally, the platform system may include separate RAMs for the respective subsystems. Similarly, the mobile platform includes a static memory controller 106 for controlling one or more non-volatile memories, e.g. a flash memory such as NAND flash memory and/or a NOR flash memory, and a corresponding static memory controller 106, in FIG. 1 shown connected to the application subsystem. For example, during operation of the mobile platform system in a stand-alone configuration, software for the access subsystem 101 and the application subsystem 102 may be loaded from a flash memory connected to static memory controller 106 to the RAM 150. For the purpose of the present description, it will be assumed that the memory/memories is/are accessed from the application CPU. However, as will be discussed below, the boot procedure described herein is also applicable for a mobile platform system that does not include non-volatile memory. The application subsystem of FIG. 1 is further shown to include a further memory controller 180.

The access subsystem and the application subsystem may be implemented on the same chip or as separate chip sets interconnected via a suitable interface. While the access and application CPUs are always present, in some configurations a further, external CPU may be connected to the system as described herein. It will further be understood that alternative implementations of a mobile platform system may include additional and/or alternative components. Examples of such mobile platform systems are disclosed in international patent application WO 2005/041601.

As will be described in greater detail below, the boot code is either loaded from an external interface, i.e. in the bridge or service mode case, or from flash memory included in the platform system, e.g. flash memory attached to e.g. interface 106 or 180 in FIG. 1. Irrespectively of whether the boot code is loaded from an external or an internal interface, the initial boot code to be loaded is stored on the ITCMs of the respective CPUs.

Figure 2:
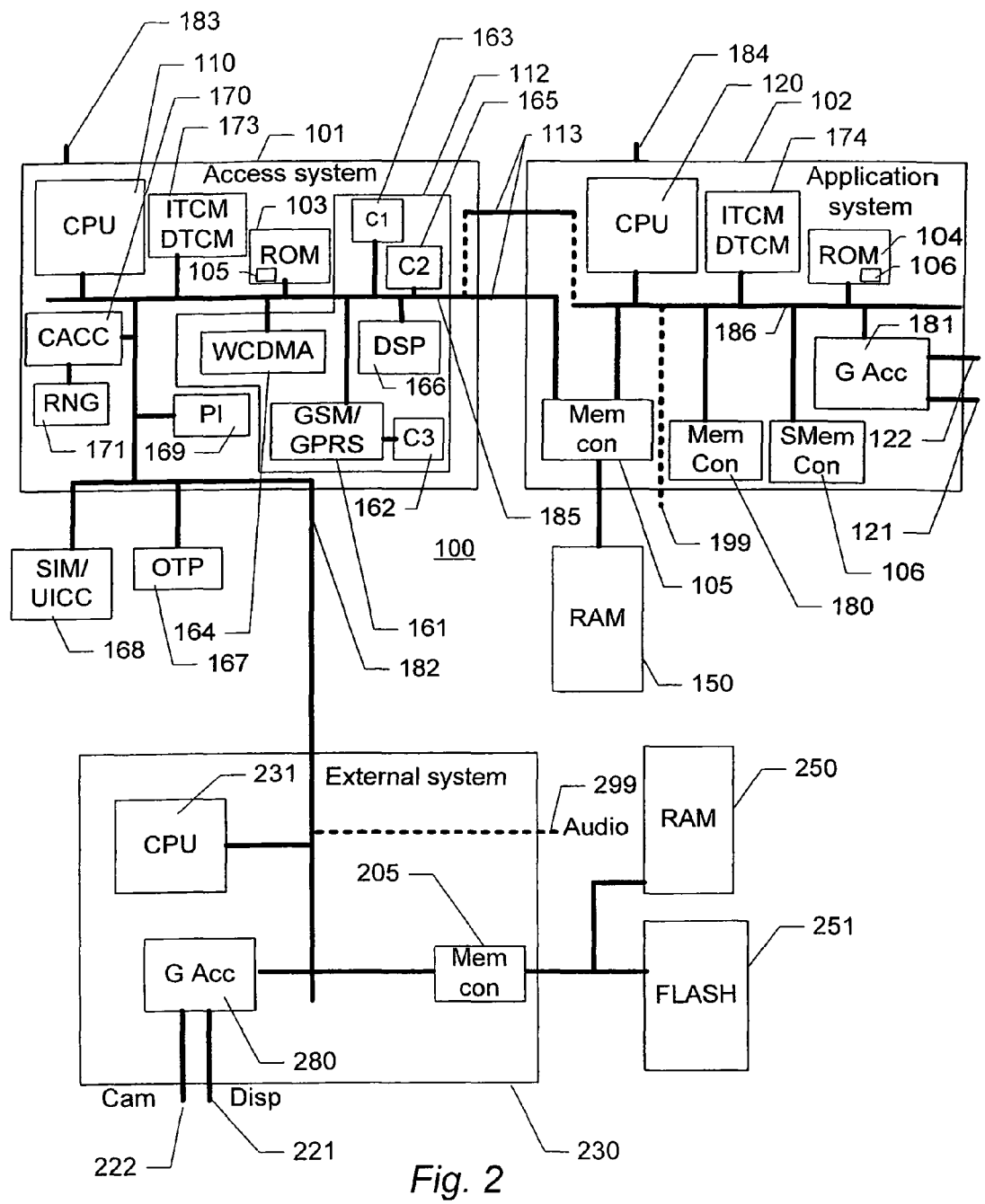
FIG. 2 shows a schematic block diagram of a mobile platform including two CPUs in a bridge configuration.

FIG. 2 shows a schematic block diagram of the mobile platform 100 described in connection with FIG. 1 in a bridge configuration. The mobile platform system 100 is shown connected to an external system 230, including an external CPU 231, via one of the interfaces 182 of the platform system, e.g. via a USB interface. The external system 230 in FIG. 2 is further shown to include a graphics accelerator module 280 providing a camera interface 222 and a display interface 221, as well as a memory controller 205 for controlling access to a RAM 250 and a flash memory 251. The external system of FIG. 2 further includes an audio interface 299. The external system 230 may also be used to boot the mobile platform in service mode so as to perform an external load. It will be appreciated that the external system may include alternative and/or additional components.

In the system of FIG. 2, the mobile platform itself does not include a flash memory and may thus be referred to as a flash-less bridge configuration in which the mobile platform system is booted via the bridge interface 182. In the configuration of FIG. 2, the application CPU 120 may be disabled during the boot process as described herein, since during normal operation and after completion of the boot process, the external CPU 231 performs the functions of the application system.

Figure 3:
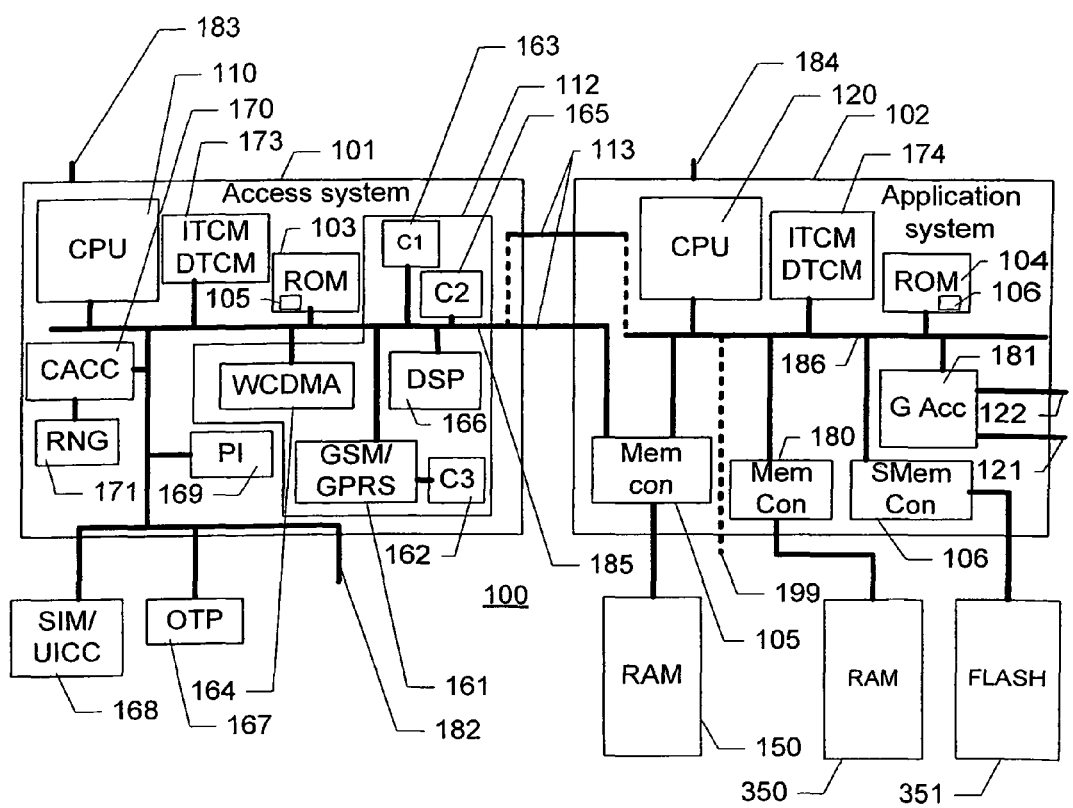
FIG. 3 shows a schematic block diagram of a mobile platform including two CPUs in a non-bridge configuration.

FIG. 3 shows a schematic block diagram of the mobile platform of FIG. 1 when configured in a non-bridge configuration. The mobile platform 100 is identical to the platform shown in FIG. 1, but includes an additional RAM 350 and a flash memory 351. The flash memory 351 may thus include boot configuration information and/or security configuration information for use by the mobile platform during the boot process. When the contents of the flash memory are integrity protected, the security of the system is increased. In some embodiments, all the memories included in or connected to the mobile platform system (such as the RAM 150, the RAM 350, the flash memory 351, the ITCM/DTCM 173 and 174) are integrity protected.

In the following an embodiment of a boot procedure for a mobile platform system as described above will be described in greater detail with reference to FIGS. 4a-e. In one embodiment of the boot procedure which is applicable irrespective of the hardware configuration, the access CPU determines from which interface or memory to read the boot software and the application CPU determines or receives information from the access CPU whether to read the boot software from an interface or internal memory. For the purpose of the present description, it will be assumed that if the mobile platform includes a non-volatile memory this memory is accessible by the access CPU, thus providing a particularly low-complex solution. However, it will be appreciated that the method may be modified so as to cover implementations where the non-volatile memory is accessible via the application CPU.

FIGS. 4a-e show a flow diagram of an example of a boot process for a mobile platform.

The embodiment of a boot process for a 2-CPU mobile platform system shown in FIG. 4 involves at least the access CPU 110 and the application CPU 120 of the mobile platform. The boot process may further involve an external CPU 231 when the mobile platform system is booted in a bridge configuration or another external computational entity 340, such as a PC, functioning as a service device when the mobile platform system is booted in service mode.

Figure 4A:
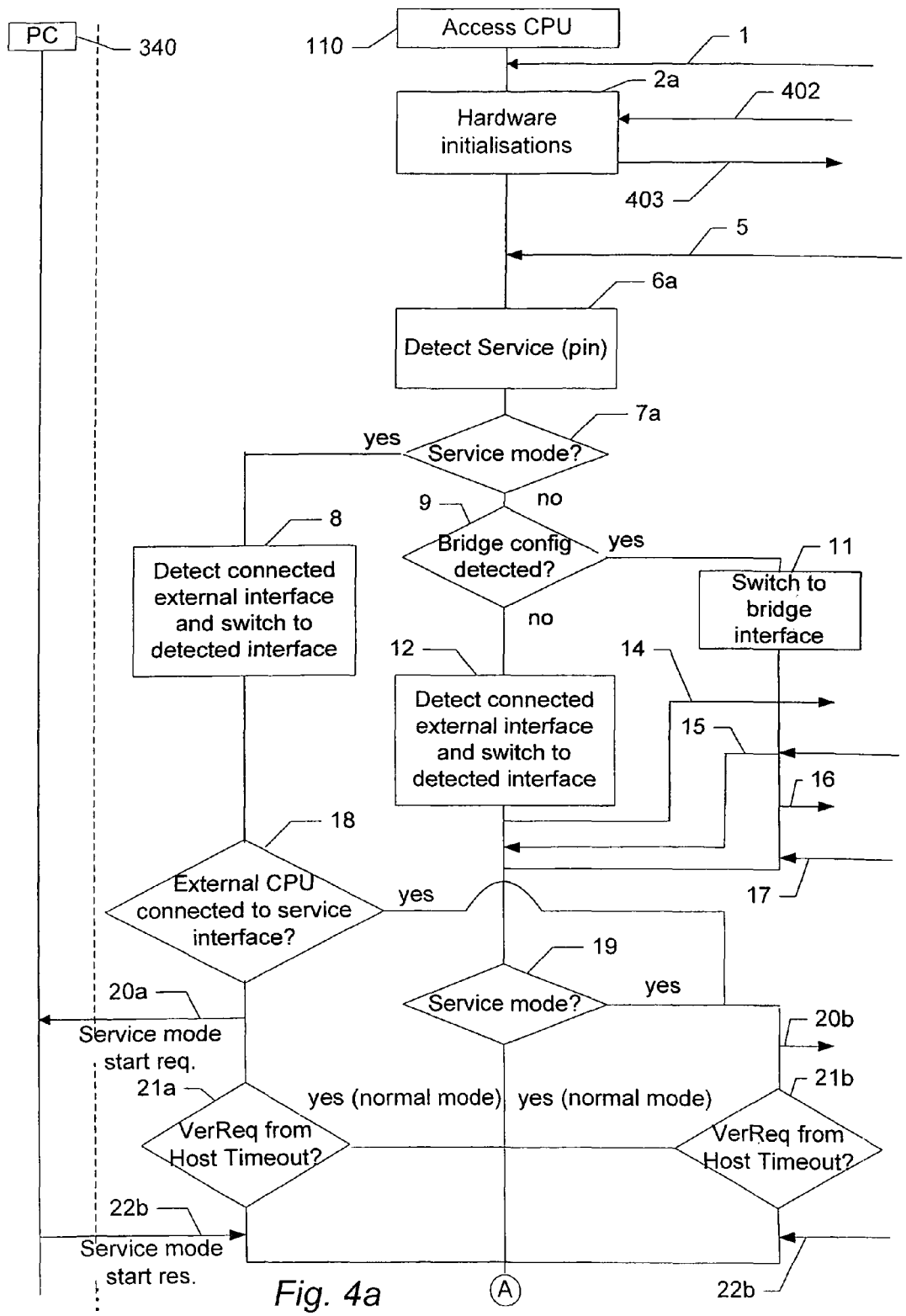
FIGS. 4a-e show a flow diagram of an example of a boot process for a mobile platform.
Figure 4B:
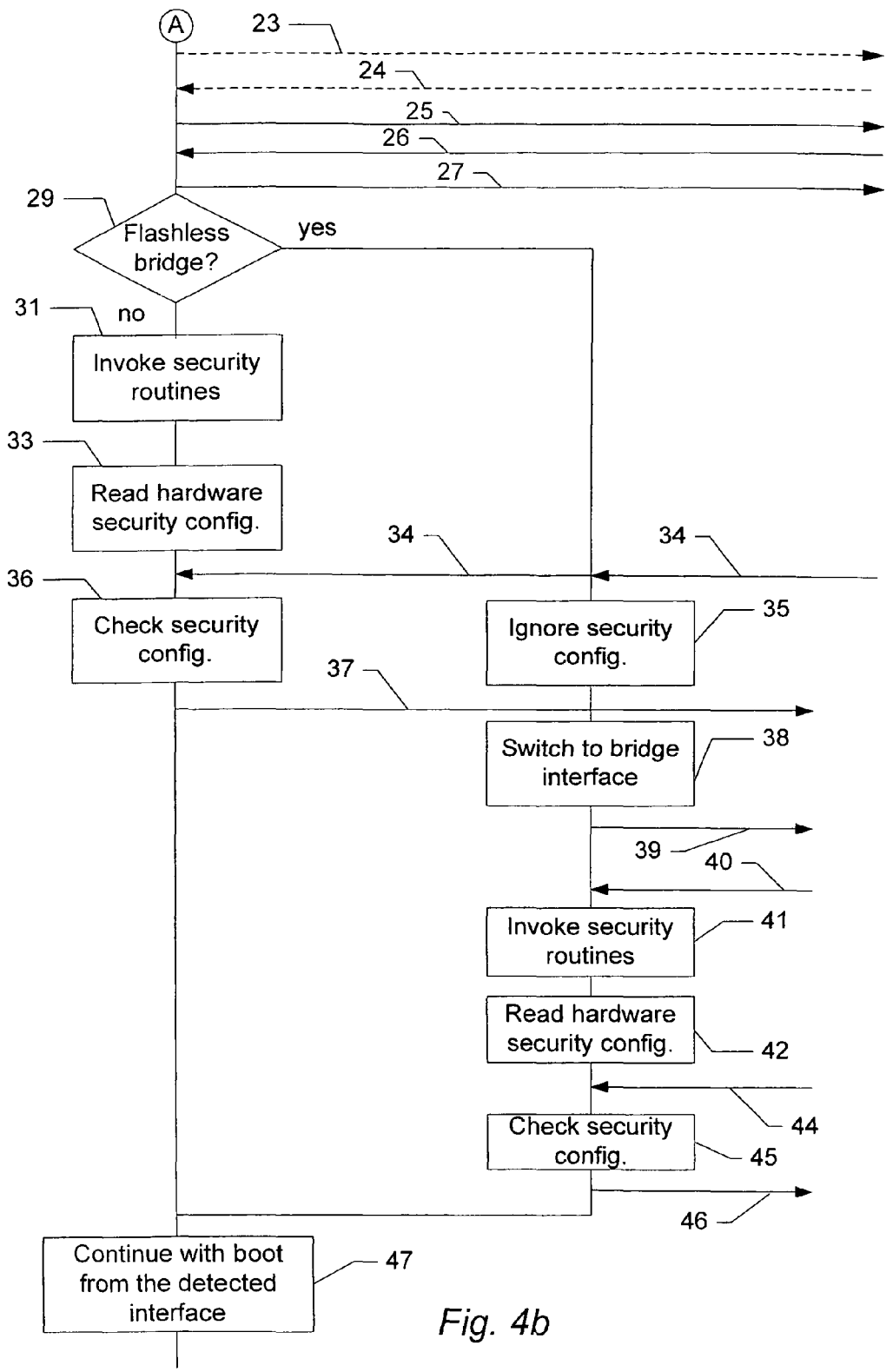
Figure 4C:
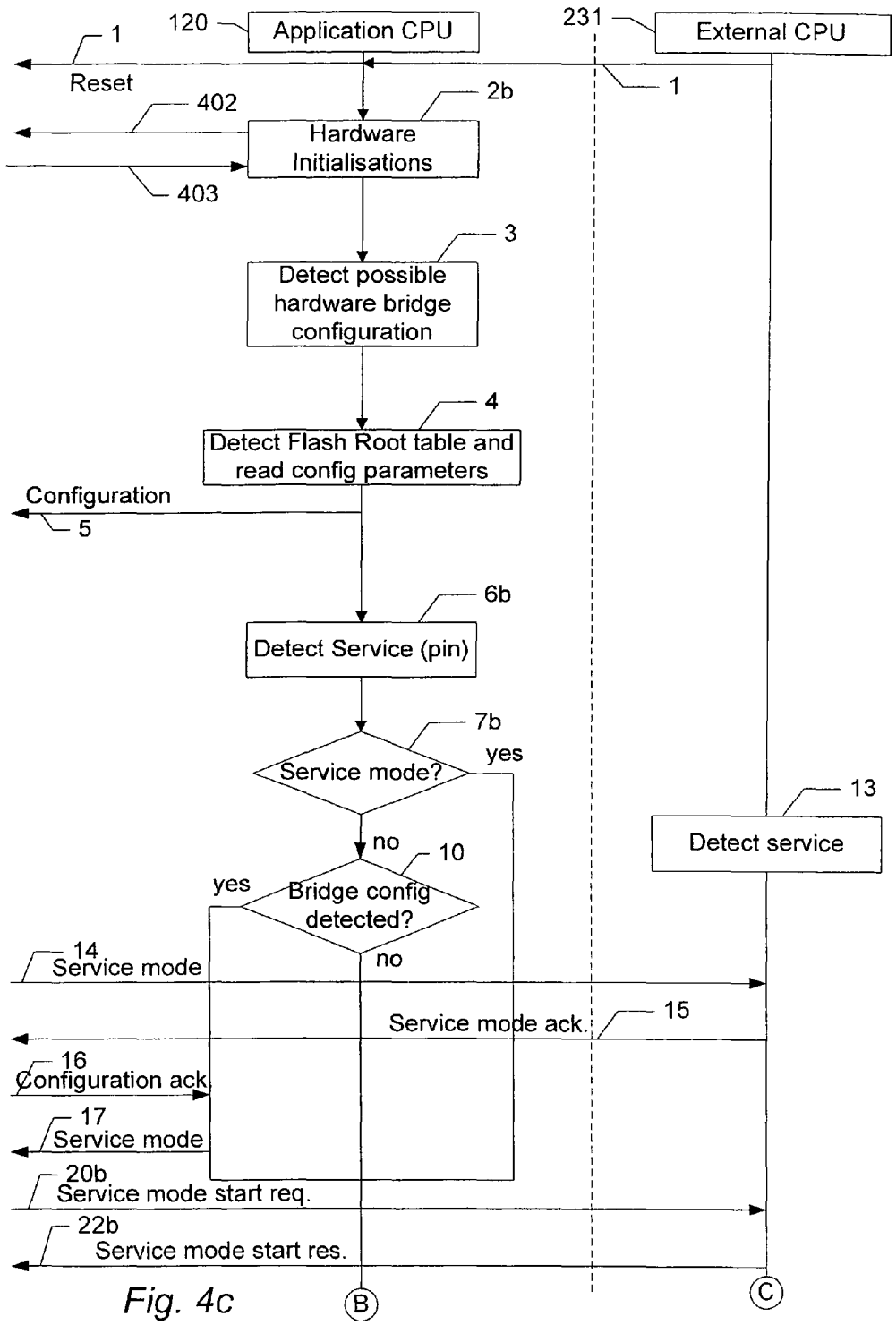
Figure 4D:
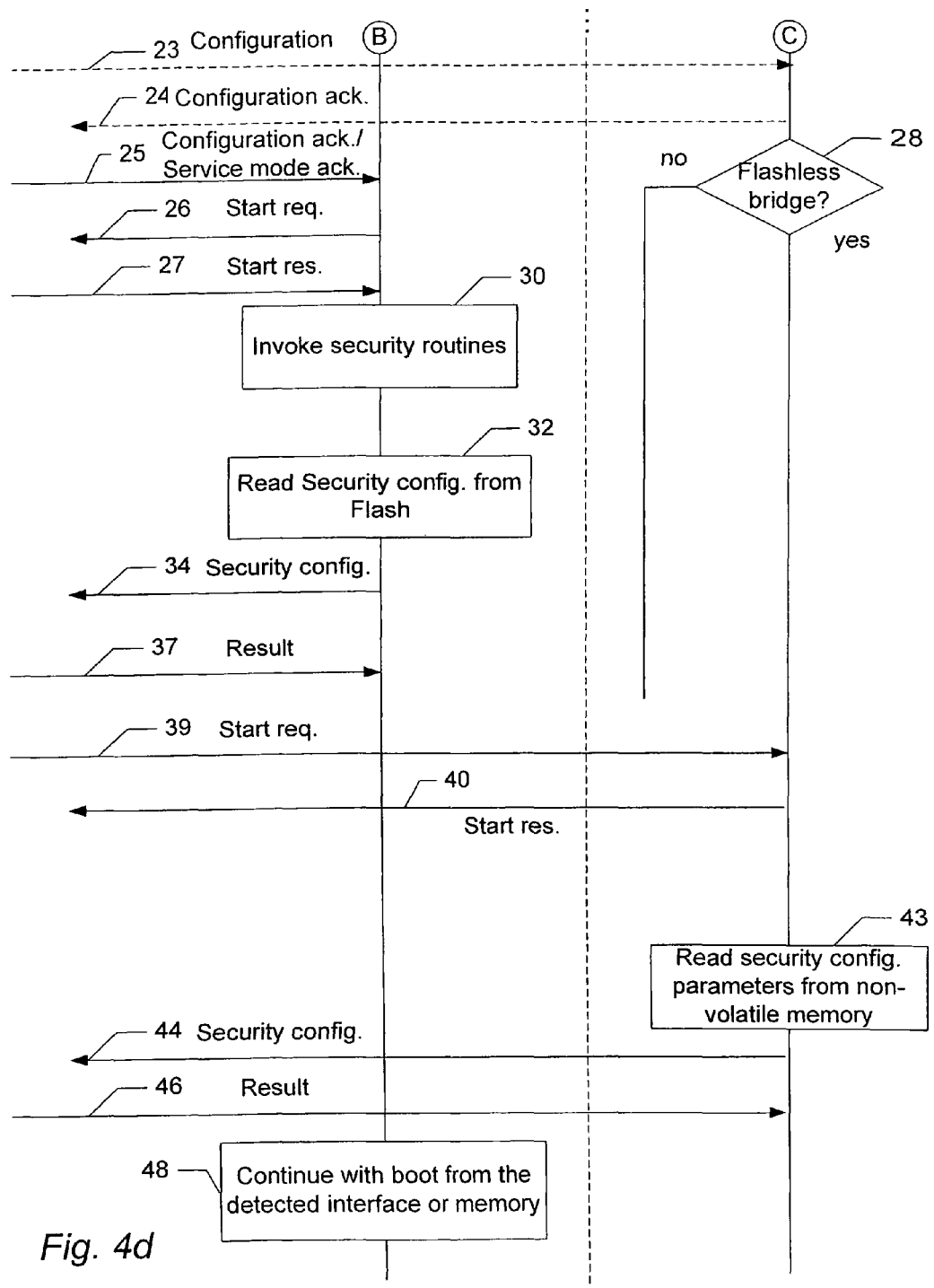
Figure 4E:
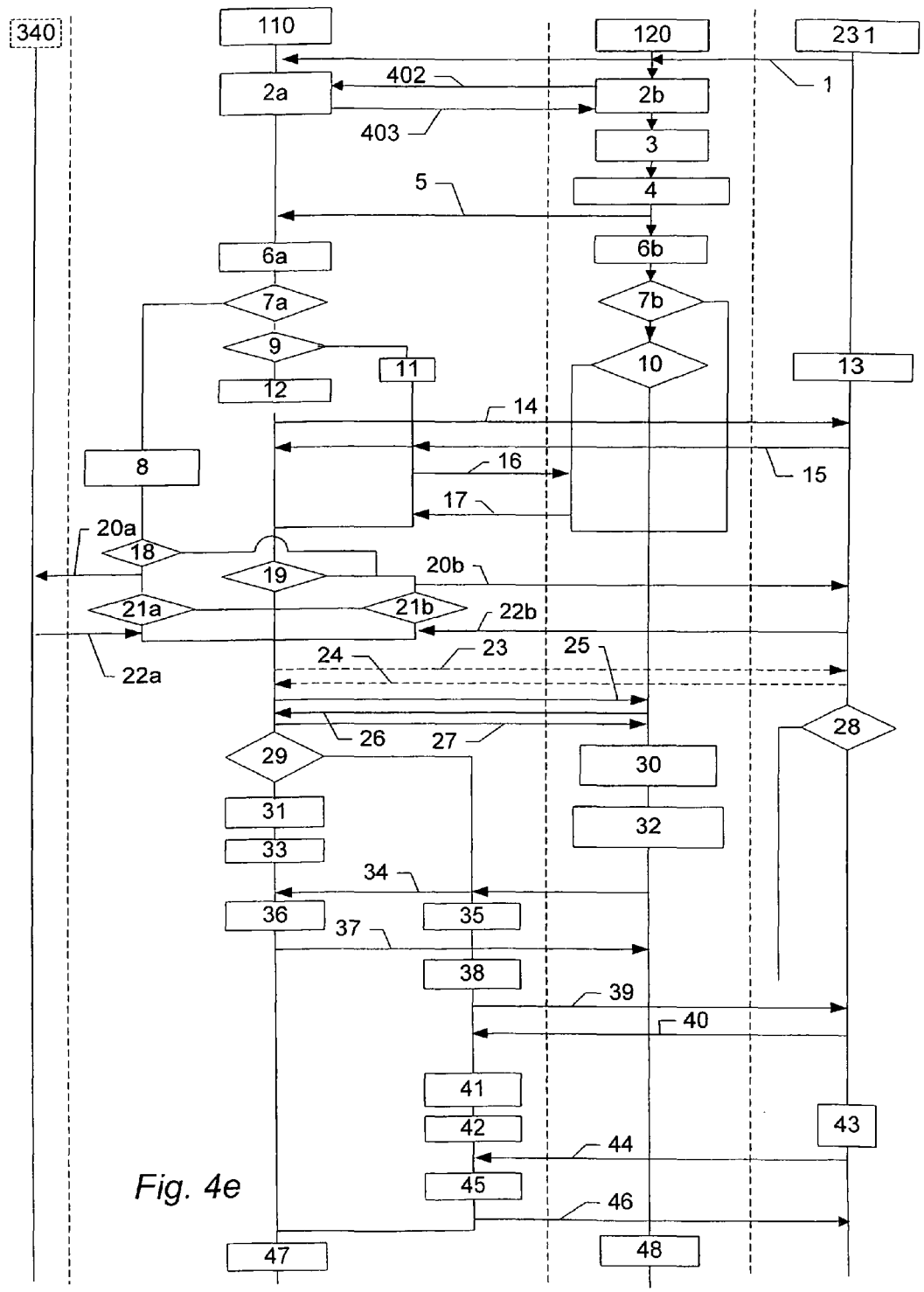

In particular, FIGS. 4a-b show the steps performed by the access CPU 110 and the PC 340, while FIGS. 4c-d show the steps performed by the application CPU 120 and the external CPU 231, and FIG. 4e shows an overview over the entire boot process. Horizontal lines indicate messages/signals communicated between the access CPU 110, the application CPU 120, the external CPU 231, and the service device 340, respectively.

The access and application CPUs 101 and 102 reside on the mobile platform, while the external CPU 231 is comprised in an external system, e.g. an external device, and external chip set, or the like, and connected to the platform system in a bridge configuration. When the platform system is not booted in a bridge configuration, the external CPU 231 is not present and mobile platform system does not receive any message from the external CPU. In case of a non-bridge configuration and when the mobile platform system is booted in a so-called "service mode", the mobile platform system loads the boot software from another external entity 340, e.g. a PC. When the system is not booted in service mode, but e.g. in a normal operation mode, the service device 340 is not present.

The boot process of FIG. 4 is initiated by a reset signal 1 received by the access CPU 110 and the application CPU 120, causing the access CPU at step 2a and the application CPU at step 2b to perform a platform reset, including power on, an initial synchronisation as indicated by synchronisation, and/or the like. If the mobile platform system is booted in a bridge configuration, the reset signal 1 may come from the external system 231 that typically will boot first. The trigger signal 1 may be forwarded to trigger further systems. Furthermore, the access CPU at step 2a and the application CPU at step 2b perform an initialization of hardware blocks and a potential initialisation and checking of the internal CPU communication with a handshake as indicated by horizontal lines 402 and 403.

In some implementations the application CPU 120 may be configured to detect any bridge interface using hardware settings. For example, the application CPU may check the signals on some external pins. The signals may be configured to allow the application CPU to read configuration information. If this is the case, the application CPU detects the bridge interface at step 3. Alternatively, the access CPU may perform this detection (this option is not shown in FIG. 4).

In step 4, the application CPU 120 detects whether bridge configuration information is available on non-volatile storage connected to the application CPU 120. For example, in a configuration where the mobile platform system includes a flash memory, such configuration information may be stored in a configuration file of the flash memory.

If the application CPU 120 has detected a bridge interface in step 3 or found bridge information in step 4, the application CPU forwards the relevant information to the access CPU 110 via message 5. However, as mentioned above, in some configurations the mobile platform system may not include a non-volatile memory, or the memory may not include configuration information. In this case the application CPU will not be able to obtain this information in step 4, and it may inform the access CPU via message 5 accordingly, thus causing the access CPU to initiate an interface polling sequence as described below.

In steps 6a and 6b, the access CPU 110 and the application CPU 120 each read the service PIN status, i.e. detect whether a service pin connected to the respective CPUs is set. In steps 7a and 7b, the access CPU 110 and the application CPU 120, respectively, determine the mode of operation (service/non service), and proceed accordingly. If the service pin indicates service mode, the access CPU continues at step 8, while the application CPU awaits a message/signal from the access CPU. Otherwise, i.e. if service mode is not detected, the access CPU proceeds at step 9 and the application CPU proceeds at step 10.

In step 8, i.e. if service mode was detected at step 6a, the access CPU 110 checks whether any of the potential external service mode boot interfaces (USB, UART, etc.) are connected to an external system 340. For example, the access CPU may check all its applicable interfaces in a predetermined polling order. If any interface is connected, this interface is selected. The entity connected to the interface may be an external CPU 231, i.e. the mobile platform system may be booted in a bridge configuration in service mode, or the entity connected to the detected interface may be a different computational entity 340. Accordingly, the access CPU proceeds at step 18 and determines whether it is the external CPU that is connected to the service interface.

In step 9 the access CPU 110 determines whether the access CPU 110 has received bridge configuration information in step 5, i.e. information as to whether a bridge configuration applies and on which interface. If the access CPU has received information indicating a bridge interface, the access CPU continues at step 11 and switches to the detected bridge interface. Otherwise, the access CPU continues at step 12 and checks whether an external CPU is connected to one of the applicable external bridge boot interfaces of the access CPU (e.g. USB, UART, MSL, SPI, and/or the like). If an external CPU is connected to any of the interfaces, the access CPU selects the detected interface; otherwise the boot interface is determined to be an internal interface to a non-volatile memory of the mobile platform system. The access CPU sends a request 14 for operation mode information (e.g. service/normal) to the external CPU. If the access code does not detect any connected interface at step 12 the sequence is false and it goes for reset.

Similarly, the application CPU determines in step 10 whether a bridge configuration was detected in step 3 or step 4. If a bridge configuration was detected, the application CPU awaits a configuration acknowledgement message 16 from the access CPU; otherwise, the application CPU awaits a message 25 from the access CPU as described below.

In case of a bridge configuration where an external CPU 231 is present, the external CPU 231 detects in step 13 whether the mobile platform system is to be booted in service mode. For example, the external CPU may receive a user command/input and initiate a boot of the mobile terminal platform in service mode in response to the user command/input.

Upon receipt of the request 14 for service mode information from the access CPU, the external CPU determines that the access CPU is ready for exchanging data. The external CPU then sends service/normal mode information 15 to the access CPU. If the access CPU fails to receive this information, the access CPU determines that an unknown configuration applies and aborts the boot process.

If the bridge configuration was detected by the application CPU, the access CPU sends, upon receipt of the service/normal mode information 15, a configuration acknowledgement 16 to the application CPU confirming the service mode detection. In response to the configuration acknowledgement 16, the application CPU sends a request 17 for service mode status to the access CPU.

After exchanging messages 14 and 15 and, if applicable, messages 16 and 17, the access CPU continues at step 19.

At step 18, the access CPU determines whether the service interface detected in step 8 is the same as the bridge interface, i.e. whether the connected external interface detected in step 8 is connected to the external CPU in a bridge configuration. If this is the case, the access CPU proceeds by sending a service mode request 20b to the external CPU 231; otherwise the access CPU sends a service mode request to the service device 340. It will be appreciated that the distinction between the requests 20a and 20b in FIG. 4 is mainly for diagram consistency reasons, as the access CPU merely sends the service mode request to the service interface that was detected in step 8.

At step 19, the access CPU determines whether the mode indication 15 from the external CPU indicates operation in service mode. If this is the case, the access CPU continues by sending a service mode request 20b to the external CPU 231 as described above; otherwise, if a bridge configuration was detected, the access CPU sends a bridge configuration message 23 to the external CPU; otherwise, the access CPU directly sends a configuration acknowledgement message 25 to the application CPU.

Hence, the access CPU sends the service mode start request 20a or 20b, respectively, to the respective external system, i.e. the service device 340 or the external CPU 231 when in bridge configuration. The service mode start request is a request for preparing the system for boot over the external interface. For the purpose of the example shown in FIG. 4, the service mode in bridge configuration is thus assumed to be performed via the bridge interface and not over any of the other possible interfaces of the access subsystem. However, it will be appreciated that the boot sequence may readily be extended to cover also the latter case, e.g. by performing step 8 at this stage, i.e. after the detection of the bridge interface.

In steps 21a and 21b, respectively, the access CPU determines whether a cable or other connection was detected on any of the interfaces or whether a time-out occurred. If no cable was detected or if a time-out occurred, the access CPU aborts the service mode process and proceeds in normal mode instead, i.e. by sending the bridge configuration message 23 to the external CPU.

Otherwise, the external system, i.e. the service 340 or the external CPU 231 as the case may be, acknowledges the service mode start request via messages 22a or 22b, respectively. Upon receipt of this acknowledgment, the access CPU continues by sending message 23 to the external CPU or message 25 to the application CPU, depending on whether a bridge configuration was detected or not.

If a bridge configuration has been detected, the access CPU 110 sends a bridge configuration message 23 to the external CPU 231. The message 23 may also include information on whether a fallback to normal mode was done or not, e.g. in step 21a, b, respectively.

Upon receipt of the bridge configuration message 23, the external CPU 231 returns an acknowledgment 24 together with configuration information from the external CPU, such as flashless or flash configuration information, Subsequently, the access CPU sends a message 25 to the application CPU 120: If service mode request 17 was received by the access CPU, i.e. if a bridge configuration was detected, the message 25 includes a response with service mode information. In this case, the message 25 may include the service mode information that the access CPU received from the external CPU in message 15. If no bridge configuration was detected, the message 25 includes a configuration acknowledgement message to the application CPU instead.

In response to message 25, the application CPU 120 returns message 26 so as to signal that the application CPU is ready to start the security checks and then the software boot loading process.

In response to message 26, the access CPU acknowledges in message 27 the ready to start.

The following steps of the boot sequence depend on whether the boot process is performed with non-volatile memory on the mobile platform system. Accordingly, in step 28 the external CPU 231 determines whether the external CPU 231 is configured for a boot with non-volatile storage on the mobile platform system. If this is the case the external CPU continues the boot process of its own system independently from the mobile platform system from this point until both systems are up and running. Otherwise the external CPU 231 awaits a message 39 from the access CPU indicating that the access CPU is ready for performing security checks.

Similarly, in step 29, the access CPU determines whether a bridge interface has been detected (in step 12) but no non-volatile storage on the platform has been found, e.g. in the case of a flashless bridge configuration or in the case of an uncustomized flash. If this is the case, the access CPU switches to the bridge interface in step 38.

Otherwise the access CPU proceeds at step 31, where the access CPU 110 invokes a number of security checking routines. In one embodiment, the security checking routines include a check of the platform security configuration and a check of the software loading.

At subsequent step 33, the access CPU reads security hardware settings, if applicable, i.e. if such security hardware settings are present as part of a given implementation of the mobile terminal platform. Examples of such security hardware settings include One-Time-Programmable Memory, e-fuse registers etc. These settings may be used to verify security configuration and software to be loaded.

Similarly, in response to the ready signal 24, the application CPU 120 invokes in step 30 a corresponding number of security checking routines. In one embodiment, the security checking routines include a check of the platform security configuration and a check of the software loading.

In step 32, the application CPU reads security configuration parameters from the non-volatile storage medium. If no memory or parameters are detected, the application CPU saves this state information in a suitable internal memory such as a RAM.

The application sends the security configuration information 34 obtained at step 32 to the access CPU. If the application CPU has not found any configuration, the application CPU informs the access CPU about this fact.

If there is no non-volatile memory on the platform (as determined in step 29), the access CPU may simply disregard the security configuration information received from the application CPU, as indicated by step 35.

In step 36, the access CPU checks the received security configuration information. For example the check may include an integrity check of the received security configuration. After successful completion of the security check, the access CPU returns an acknowledgment 37 of the receipt of the security configuration information to the application CPU, and the access CPU proceeds at step 47.

In step 47, the access CPU continues with the boot process from the detected (internal or external) interface. The boot process may include the downloading of software via the detected interface, the security (e.g. integrity) checking of the downloaded software, and execution of the software.

As described above, if the access CPU in step 29 has determined that a bridge interface has been detected (in step 12) but no non-volatile storage on the platform has been found, e.g. in the case of a flashless bridge configuration or in the case of an uncustomized flash, the access CPU switches to the detected bridge interface in step 38.

Subsequently, the access CPU sends a signal 39 to the external CPU 231 via the bridge interface indicating that it is ready to start the security checks and then the software boot loading process.

The external CPU 231 returns an acknowledgement 40 of the ready to start signal 39.

In subsequent step 41, the access CPU invokes the security checking routines, e.g. platform security configuration checking and software load checking. In step 42, the access CPU reads security hardware settings, if applicable, i.e. if such security hardware settings are present as part of a given implementation of the mobile terminal platform. Examples of such security hardware settings include One-Time-Programmable Memory, e-fuse registers etc. These settings may be used to verify security configuration and software to be loaded.

In step 43, the external CPU 231 reads security configuration parameters from a non-volatile storage medium connected to the external CPU. If no memory or parameters are detected, the external CPU saves this state information in a suitable internal memory such as a RAM.

Subsequently, the external CPU sends the security configuration parameters 44 obtained at step 43 to the access CPU. If no configuration has been found, the external CPU informs the access CPU about this fact.

In step 45, the access CPU checks the received security configuration information 44, e.g. including integrity checking and/or the like of the received information. Subsequently, the access CPU returns an acknowledgement 46 of the receipt of the security configuration information to the external CPU.

Subsequently, the access CPU continues at step 47 with the boot process as described above.

Similarly, in step 48 the application CPU continues with the boot from the detected interface or memory. For example, at this stage, if no flash configuration has been found, the application CPU may wait for the next message from the access CPU. On the other hand, if a flash configuration has been found, the application CPU may continue to boot from the flash memory. If a bridge configuration applies, the application CPU continues the boot over the internal interface and the first code to be executed will typically shut down the application system, as the application is typically not needed in the bridge configuration where the external CPU plays the role of the application CPU.

In summary, described above is an embodiment of a boot procedure for a two-CPU architecture controlled by ROM-based code on both CPU systems. The first CPU (which may be an application CPU of a mobile platform system) acts as a master CPU in the boot process and the boot process includes three main steps:

The first CPU detects possible boot configuration parameters (hardware and software) on a dedicated configuration file stored in non-volatile memory and propagates this information to the second CPU (which may be an access CPU of a mobile platform system.)

If boot configuration was found, the second CPU uses this information to boot from the correct boot interface. If no information was found by the first CPU, the second CPU searches for a connected boot interface.

Finally, the boot is continued by loading boot software from the detected boot interface and the boot software is security checked by one of the CPUs before the boot software is allowed to be executed. The security check may be based on security checking configuration information stored protected in and read at boot time from a non-volatile memory, e.g. the memory that also contains the boot configuration information.

Hence, the above boot process accounts for the different possible boot scenarios including non-bridge configurations, bridge configurations, service mode (i.e. for software flashing), and normal operation mode, by means of a boot interface detection procedure, e.g. as described in connection with FIG. 4. However, it will be appreciated that the boot sequence of FIG. 4 can be modified, e.g. by modifying the order of detection and/or the division of tasks between the access and the application CPU. Furthermore, the boot process may also be applied to an architecture with additional CPUs.

In the above embodiment, the application CPU functions as a master during the initial boot process, since the application CPU generally is the CPU that has access to the memory where configuration parameters may be found. However, it will be appreciated that in alternative embodiments, the access CPU may function as a master. Furthermore, in some embodiments, the access CPU may have access to the memory including configuration parameters, if any.

Accordingly, although some embodiments have been described and shown in detail, the invention is not restricted to them, but may also be embodied in other ways within the scope of the subject matter defined in the following claims. In particular, the boot process described herein has mainly been described in the context of a mobile platform system including an access CPU and an application CPU. It will be appreciated, however, that the boot process may also be applied to other systems, e.g. a 2-CPU mobile platform system with a different functional split between the two CPUs, or a multi-CPU processing system used for other applications than mobile communications systems.

The method, product means, and device described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of booting a processing device having an application processing unit and an access processing unit, the processing device being selectably bootable in one of a stand-alone configuration and a bridge configuration; wherein, in the stand-alone configuration, the access processing unit and the application processing unit are both initialized to be operational, and wherein in the bridge configuration only the access processing unit is initialized to be operational and is initialized to be in operational connection with an external processing unit via a communications interface, the method comprising the steps of:

determining by the access processing unit, whether the processing device is to be booted in the standalone configuration or in the bridge configuration, wherein the access processing unit determines that the device is to be booted in the bride configuration when the access processing unit receives bridge configuration information from the application processing unit;

if the processing device is to be booted in the bridge configuration, receiving a boot mode indication from the external processing unit via the communications interface, the boot mode indication being indicative of whether the processing device is to be booted in a service mode in which the processing device is configured to load software from the external processing unit into a non-volatile memory of the processing device; and, responsive to the received boot mode indication, booting the processing device in said service mode.

2. The method according to claim 1, further comprising the step of receiving, if the processing device is to be booted in the stand-alone mode, a boot mode indication via a user-interface of the processing device, the boot mode indication being indicative of whether the processing device is to be booted in the service mode.

3. The method according to claim 1, wherein the processing device is a communications device for providing at least one communications service, and the application processing unit is an application central processing unit adapted to execute at least one application software component for providing functionality different from the communications service, and wherein the access processing unit is a communications central processing unit adapted to control the communications service.

4. The method according to claim 1, wherein the processing device is a platform circuit for one or more mobile communications products.

5. The method according to claim 1, wherein each of the application and access processing units includes a corresponding read-only-memory having stored thereon, boot code for controlling booting of the corresponding processing unit.

6. The method according to claim 1, wherein in the bridge configuration, the external processing unit performs application functions in communication with the access processing unit.

7. The method according to claim 1, further comprising the step of communicating boot information between the application and access processing units by means of a predetermined boot protocol.

8. The method according to claim 7, wherein communicating boot information includes performing a security verification of the communicated boot information.

* * * * *